United States Patent [19]

Luly

[11] Patent Number: 4,608,571
[45] Date of Patent: Aug. 26, 1986

[54] COLLAPSIBLE PARABOLIC REFLECTOR

[76] Inventor: Robert A. Luly, 449 S. Sierra Way, San Bernardino, Calif. 92406

[21] Appl. No.: 247,922

[22] Filed: Mar. 26, 1981

[51] Int. Cl.[4] .............................................. H01Q 15/20
[52] U.S. Cl. .................................. 343/781 P; 343/840; 343/915
[58] Field of Search ..................... 343/781 P, 840, 915, 343/916

[56] References Cited

U.S. PATENT DOCUMENTS

| | | | |
|---|---|---|---|
| 2,072,262 | 3/1937 | Herzog et al. | 343/817 |
| 2,539,511 | 1/1951 | Hansen et al. | 343/781 P |
| 2,674,693 | 4/1954 | Millet et al. | 343/915 |
| 2,702,858 | 2/1955 | Foster | 343/781 P |
| 2,829,366 | 4/1958 | Armstrong et al. | 343/781 P |
| 2,945,234 | 7/1960 | Driscoll | 343/915 |
| 3,286,270 | 11/1966 | Kelly | 343/915 |
| 3,360,798 | 12/1967 | Webb | 343/915 |
| 3,509,576 | 4/1970 | McLain | 343/915 |
| 3,521,290 | 7/1970 | Bahiman et al. | 343/915 |
| 3,599,218 | 8/1971 | Williamson et al. | 343/915 |
| 3,635,547 | 1/1972 | Rushing et al. | 343/915 |
| 4,249,184 | 2/1981 | Vines | 343/915 |

Primary Examiner—Eli Lieberman
Attorney, Agent, or Firm—Beehler, Pavitt, Siegemund, Jagger & Martella

[57] ABSTRACT

A portable, lightweight, folding parabolic reflector antenna for reception of microwave signals includes an axial wave guide tube which constitutes the main structural supporting member of the antenna, a ten to fifteen foot diameter dish mounted to the wave guide and a sub-reflector supported at the forward end of the wave guide. A low noise amplifier may be mounted to the rear end of the wave guide for amplification of the received signals. The folding dish includes a pre-formed dished reflector of pliable material supported by a radial framework of normally straight resiliently flexible spokes of tapering cross section. The spokes are pivotable by a lever system between a folded axial position and a deployed radial position. The normally straight spokes are stressed upon deployment by a perimeter cable to a curvature of the pliable dish such that the spokes and the dish are curved independently of one another and operate to correct deviations in the desired curvature of each other to thereby obtain a precisely repeatable dish curvature through many folding-unfolding cycles. A method of assembly of the folding reflector is disclosed as well as alternate embodiments of lightweight curved reflectors.

22 Claims, 20 Drawing Figures

COLLAPSIBLE PARABOLIC REFLECTOR

BACKGROUND OF THE INVENTION

1. Field of the Invention

This invention relates generally to methods for constructing dished reflector surfaces and to structures achieved thereby, and more particularly concerns a lightweight, foldable parabolic reflector and a radio frequency antenna assembly incorporating the foldable reflector.

The method and structure of the invention also pertain to the field of solar energy collectors and particularly to foldable lightweight, portable solar energy collectors.

2. State of the Prior Art

Parabolic and spherical reflectors are known and have been used in the field of communications for transmission and reception of radio signals, such as in microwave communication links, space communications and even radio telescopes. Such reflectors have also found application outside the communication areas, as, for example, in the solar energy field where they are used to collect and concentrate solar radiation.

In the past, dished reflectors of significant diameter have been large, heavy and unwieldy assemblies and very inconvenient to transport and install because the curvature of the reflector dish must be held to a high level of accuracy in order to obtain high signal gain and to avoid signal phasing problems at the focal point of the dish.

In the past, these considerations have required rigid reflector structures to achieve precise curvatures except in certain applications where it was found necessary to design parabolic or otherwise curved reflectors of folding construction, such that a reflector may be folded into a compact assembly for transportation and then deployed for use. Notably, such folding reflectors have found application in the space communications field, where space vehicles require relatively large antennas which are folded during launch within the limited space available, and are then deployed outside the earth's atmosphere.

The folding reflector structures of the known prior art have typically included a reflecting mesh supported by a skeleton framework of pivoting radial arms mounted to a central hub. The radial arms were rigid and were manufactured to the desired curvature of the reflector dish. These reflectors are deployed by simply pivoting the radial arms from a generally axial folded position to a generally radial extended or deployed position without any change in the pre-formed curvature of the radial arm. Such precisely curved, preformed arms are very expensive to manufacture and become impractical for larger diameter dishes.

The prior art known to the applicant in connection with deployable dish structures is as follows:

Paper No. 100, authored by Löf and Fester, presented at the United Nations Conference on New Sources of Energy, held in Rome in August, 1971.

The Conference proceedings concerning the area of solar energy for heating purposes, originally entitled Volume 5, Solar Energy II, has been republished by Cloudburst Press of America, Inc., 2116 Western Ave., Seattle, Wash. 98121. The title of the republished volume is unknown, but is identified as: ISBN 0-88930-031-3 (soft cover); ISBN 0-88930-032-1 (hard cover).

The reference paper is found at pages 262 through 264 of this volume. The deployable solar cooker disclosed in this paper does not teach the present invention in that it relies only on the curvature of the pre-formed dish of reflecting fabric. As described, the radial spokes are of spring metal and "flex only as forced by the fabric."

*Man's Greatest Adventure* by Laurence Allen, 1974, Library of Congress Card No. 74-17235, includes various photographs showing deployable antennas used on the lunar space mission. In particular, a small portable folded S-band dish antenna is shown at page 46. The S-band antenna photographs do not teach a curved dish structure in cooperative relationship with an independently stressed spoke framework.

The tripod-mounted S-band antenna is considerably smaller than the dishes contemplated by the applicant's invention. The structure shown in the reference, if enlarged and deployed in a 1 G gravitational field, would not be sufficiently rigid to define a usable self-supporting dished reflector surface. The small deployable dish mounted on the lunar rover vehicle has rigidly curved radial support arms.

*The ARRL Antenna Handbook*, published by the American Relay League, shows at pages 254 and 255 a 12-foot stressed parabolic dish antenna. This structure is not deployable and spokes are stressed by guy wires attached to the focus feed support boom which is not self-supporting. The perimeter wire of the reference serves as a peripheral support means for attaching the wire mesh of the reflector to the rib skeleton.

It is contemplated in the reference that the dish be made portable by removing the mesh sheet, and disassembling the rib structure. Upon reassembly, the mesh is attached by folding the edges over the wire perimeter. The ribs lie over the frontal reflecting surface of the mesh sheet, whereas in applicant's antenna the reflector surface is unbroken and the radial spokes are attached to the rear of the pliable reflector dish.

The applicant is not aware of folding dish reflectors in the 9- to 16-foot diameter range for use on the earth's surface, that is, in a 1 G gravitational field.

SUMMARY OF THE INVENTION

(a) The Folding Dish Reflector

The present invention improves over the prior art by providing a low-cost, lightweight foldable reflector assembly of precise curvature which is repeatable through many folding-deployment cycles of the reflector and which can be made of relatively low f/d ratio. Cost g and complexity is kept to a minimum by providing normally straight radial spokes for supporting the pliable reflecting surface, instead of the costly pre-formed curved radial supports of the prior art.

The preferred embodiment of the invention is a foldable reflector having a pliable substantially inelastic dish of pre-formed curvature and an independently stressed radial framework comprising a plurality of radial spokes of tapered cross section and a perimeter cable connecting the tips of the poles or spokes. This preferred embodiment is illustrated in FIGS. 1–9, and the method of making the same is shown in FIGS. 10–17.

It is contemplated, however, that three alternate embodiments are possible within the scope of this invention, and these are:

(i) A foldable reflector as in the preferred embodiment but omitting the constricted perimeter cable. The tapered spokes are thus curved only by the necessity to conform to the curvature of the pre-formed pliable dish. In this embodiment, the use of radial spokes of tapered cross section is deemed to constitute the point of novelty in that lower f/d ratios can be achieved thereby, as will be explained.

(ii) A reflector, whether foldable or of fixed deployed construction, wherein a substantially inelastic pliable dish of pre-formed curvature is assembled in cooperative relationship with an independently stressed radial framework. The framework is stressed, as by a perimeter meter cable connecting the tips of the radial members, to a curvature substantially similar to the pre-formed curvature of the pliable dish. In this embodiment the individually achieved curvatures of one of the dish or the framework operate to correct deviations in the curvature of the other to obtain a more precise overall reflector curvature. This reinforcing effect is particularly important in folding antennas to obtain a repeatable dish curvature.

(iii) A reflector wherein elastic reflecting sheet material is attached in an initially stretched condition to a plurality of fully extended normally straight members, to thereby define a reflecting disc. The radial members which preferably are of tapering cross section are then stressed by a perimeter cable, to obtain a desired curvature. The stretched reflecting fabric resiliently contracts to take up the resultant slack and thus defines a dished reflector of curvature defined by the curvature of the spokes.

Figures 7, 18, 19, 20:
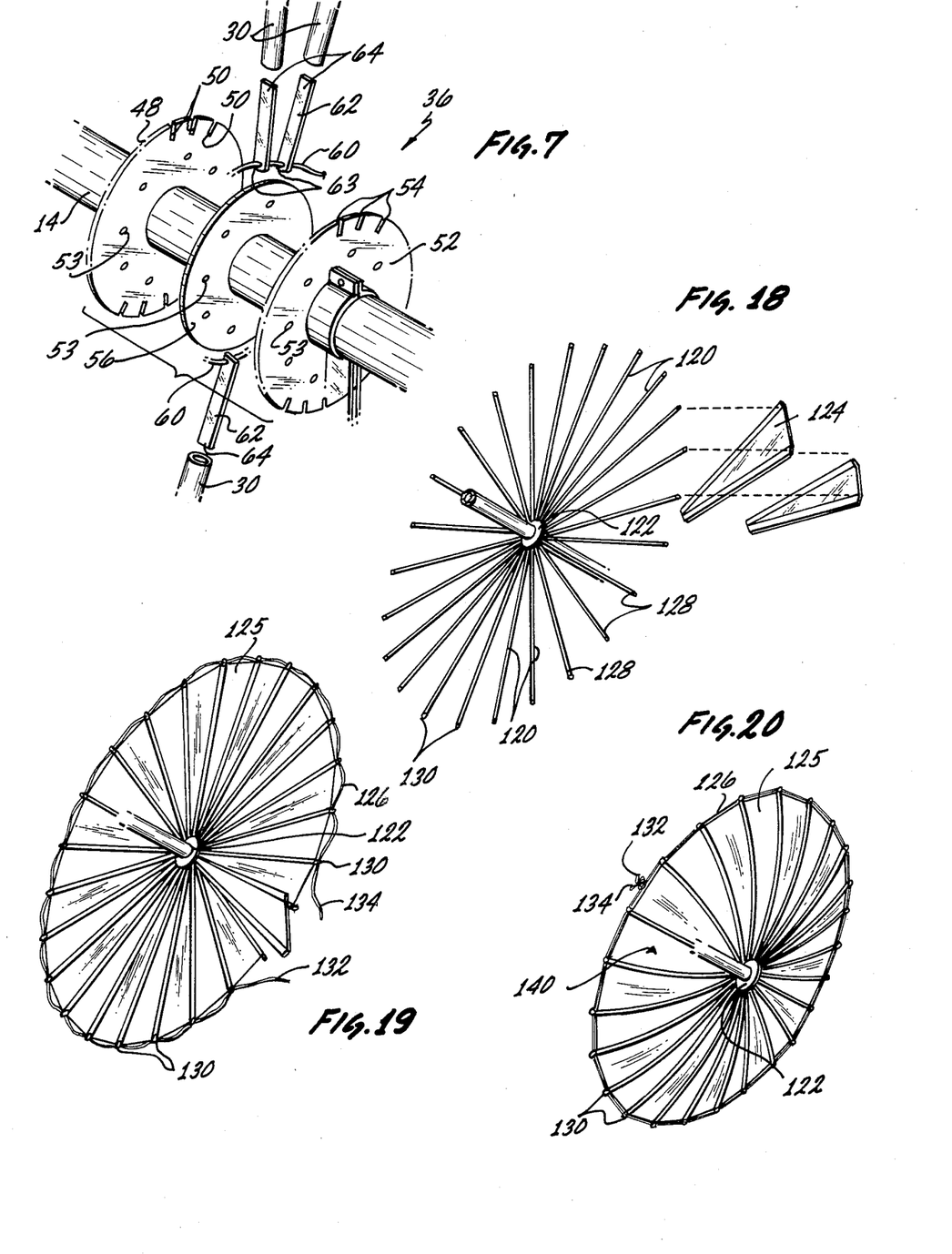

The method of making this embodiment of the invention is shown in FIGS. 18-20.

What is believed to be novel in connection with the lightweight foldable dish reflector disclosed herein among other points of novelty, is:

(i) The combination of a stressed radial framework and a pre-formed dish of pliable reflecting material as independently curved elements in cooperative assembled relationship wherein the curvature of one operates to reinforce the curvature of the other and thereby tends to correct any curvature errors or deviations that may take place. This combination is particularly useful in folding dish reflectors but is not limited thereto.

(ii) The use of rods of tapered cross section as the radial elements in the stressed framework. The tapered rods enable the construction of deeper stressed dish reflectors than has been possible until now to obtain a lower f/d ratio.

The foldable spoke framework comprises a plurality of normally straight resilient flexible rods radially mounted to a central hub for pivotal movement between a folded generally axial position and a deployed, generally radially extended position. A cable or equivalent means is threaded through the tips of the spokes to define a perimeter calculated to have a diameter less than that of the fully deployed radial spokes. Thus, the perimeter cable operates to restrain the outer portion of the spokes against full radial deployment, causing the spokes to bend under stress. The length of the permeter cable is calculated to produce a desired curvature of the spokes.

A pliable dish of reflecting sheet material is formed to a desired curvature which substantially coincides with the curvature of the stressed spokes. The dish reflector is secured to the foldable spoke framework such that the curvature of each reinforces that of the other to achieve a foldable reflector having repeatably superior accuracy of curvature.

It is well known that if a straight horizontal beam of uniform cross section is clamped at one end and the beam is flexed by application of a perpendicular force or weight at the opposite end, the beam's curvature will approach a parabolic curve through the first few degrees of arc, or about 10% of deflection. However, as the flexing force is increased to stress the beam to a greater curvature, the parabolic curve is quickly lost and the beam flexes to a greater extent at its center than at either end. Dish reflectors constructed with stressed constant diameter radial rods are therefore limited to very shallow curvature. This limitation places the prime focal point of the dish far forward from the dish; in other words, the focal distance of the dish is relatively great, compared to the diameter of the dish. This relationship is commonly given as the f/d ratio.

In reception of microwave signals it is often desirable to reduce the antenna noise figure and to suppress side lobe patterns by decreasing the antenna's f/d ratio. It is therefore one object of this invention to achieve reflectors having a relatively low f/d ratio, e.g., less than 0.6.

It has been found that a stressed rod or beam of tapering cross section will retain a parabolic curvature through a substantially greater arc of deflection than is possible with a rod of uniform cross section. Thus, reflector dishes of greater curvature and lower f/d ratio can be obtained.

Both the reflecting sheet material and the tapered radial spokes are made of low-cost readily available materials.

(b) The Antenna Structure

The novel reflector structure enables the construction of a folding reflector antenna which can be quickly and easily deployed and mounted on a tripod or other simple support structure, and can be easily and precisely aimed.

The preferred reflector antenna assembly is a Cassegrain arrangement with an axial wave guide, a large primary reflector mounted to and supported by the wave guide for reflecting electromagnetic radiation towards the front of the wave guide and a smaller secondary or sub-reflector mounted at the front of the wave guide for reflecting the radiation into the wave guide.

Such construction for a relatively large, i.e., 10- to 15-foot diameter, earthbound folding antenna is novel over the known prior art in that the wave guide also serves as the primary support for both the large main reflector and the smaller sub-reflector. Stated conversely, in a folding dish reflector which requires an axial support for a slidable element operative to fold and unfold the dish, the axial support also serves as a microwave guide in a novel antenna structure.

A low-noise amplifier housing may be attached, through a suitable transition, directly to the open rear end of the wave guide behind the main reflector. In a preferred embodiment the low noise amplifier and any desired frequency converters can be mounted directly within the rear end of the wave guide without necessity of any additional housing or transition. This technique is useful at frequency ranges which call for a wave guide diameter sufficiently large to accommodate the amplifier's electronics, and results in considerable cost savings. The weight of the amplifier counter-balances the weight of the forward portion of the wave guide and the secondary reflector attached thereto, the entire unitary assembly being supported at the wave guide, preferably behind the main reflector assembly.

It will be understood that the basic antenna structure described herein, i.e., a large folding dish reflector entirely supported by a rigid axial tube, can also serve as a solar collector dish. For such use, the sub-reflector may be removed and fluid circulated through the axial tube for heating at the dish focus.

(c) The Method of Achieving a Lightweight Reflector

The reflector assembly of this invention is preferably constructed by cutting a number of trapezoidal panels of pliable reflecting material with the divergent sides of the panels being cut along a curve calculated such that the panels may be attached one to another along the curved sides to form a complete circle of such panels, and when so attached, the panels will define a pliable centrally apertured dished surface of predetermined curvature. The panels are then attached as by sewing along the curved sides to complete such a dished reflecting surface, and radial folds are formed, as by sewing, preferably on the rear concave surface of the pliable dish reflector.

The radial folds may be of tubular nature and dimensioned for snugly receiving within each fold one tapered radial spoke. A normally straight resiliently flexible spoke of tapered cross section is inserted into each of the folds of the unsupported pliable reflector so that the thicker butt end of each spoke extends towards the center of the dished structure. The spokes are inserted one by one into the dish folds and are fastened to the dish as by screwing at the two ends of the spokes or other suitable means.

The spokes are then pivotally mounted at their butt ends to a central hub with the pliable reflecting material loosely supported or folded between the spokes. It is also possible to first mount the spokes to the center hub and then to slip the reflector dish fabric over the spokes, but this is not the presently preferred sequence of assembly.

In a preferred embodiment of the invented method, a cable is threaded through openings formed in the tip of each radial spoke to form a perimeter interconnecting the spoke tips. The cable is slidable through the tip openings and the length of the cable is constricted to define a perimeter having a predetermined diameter less than the unstressed radially extended diameter of the radial spokes. The cable thus restrains the spokes against full radial deployment and causes the spokes to curve inwardly and retains the spokes in the aforedescribed radially extended stressed condition in cooperation with the pliable dish of reflecting material. The pliable dished surface may then be deployed and stretched to smoothly conform to the predetermined curvature by simultaneously pivoting the spokes to a radially extended position, thereby stressing the tapered spokes against the restraint imposed by the cable perimeter, which thus conform to the predetermined dish curvature within the folds. The tapered spokes are retained in a stressed radially extended position during use of the reflector and are released to a generally axial unstressed folded position for transportation or storage of the reflector assembly.

The perimeter cable also provides a means for adjusting to a fine degree the final curvature of the dish in the deployed position by making adjustments to the perimeter length defined by this cable.

The cable serves the further purpose of preventing deterioration of the reflector's precise curvature from eventual stretching of the reflecting sheet material and a resultant flattening of the pre-formed pliable dish defined thereby.

(d) Alternate Method of Achieving a Lightweight Reflector

A simplified non-folding dish structure incorporating the basic elements of the dish reflector of Part (a) of this Summary is constructed by first securing the spokes in fixed radially deployed relationship to a central support and then securing a stretched elastic, reflecting sheet material between the spokes to define a reflecting disc.

A cable or equivalent means is threaded through openings formed in the tips of the spokes to define a perimeter. The cable is not secured to the tips and is free to slide through the openings therein.

The cable perimeter is then constricted to a reduced diameter so as to stress the spokes to a desired curvature. The elastic sheet material contracts as necessary from its initially stretched condition to conform to the curvature of the radial spokes, thereby defining a dished reflector surface of a desired curvature.

BRIEF DESCRIPTION OF THE DRAWINGS

FIG. 7 is an exploded perspective view of the preferred central hub assembly and mounting of the radial spokes thereto;

FIG. 18 is an initial step in an alternate method of making a dished reflector wherein radial spokes have been affixed to a central support;

FIG. 19 shows an intermediate step in the alternate method wherein stretched elastic panels have been attached to the radial spokes to define a planar disc; and, FIG. 20 shows the completed dished reflector wherein the radial spokes are stressed to a desired curvature by a constricted perimeter cable.

DETAILED DESCRIPTION OF THE INVENTION

Although the following description is made primarily in connection with a radio receiving antenna suitable for reception of satellite television transmissions in the three to four gigahertz frequency band, it will be understood that the folding dish reflector structure of this invention is not limited to this particular application.

Figures 1, 2, 5:
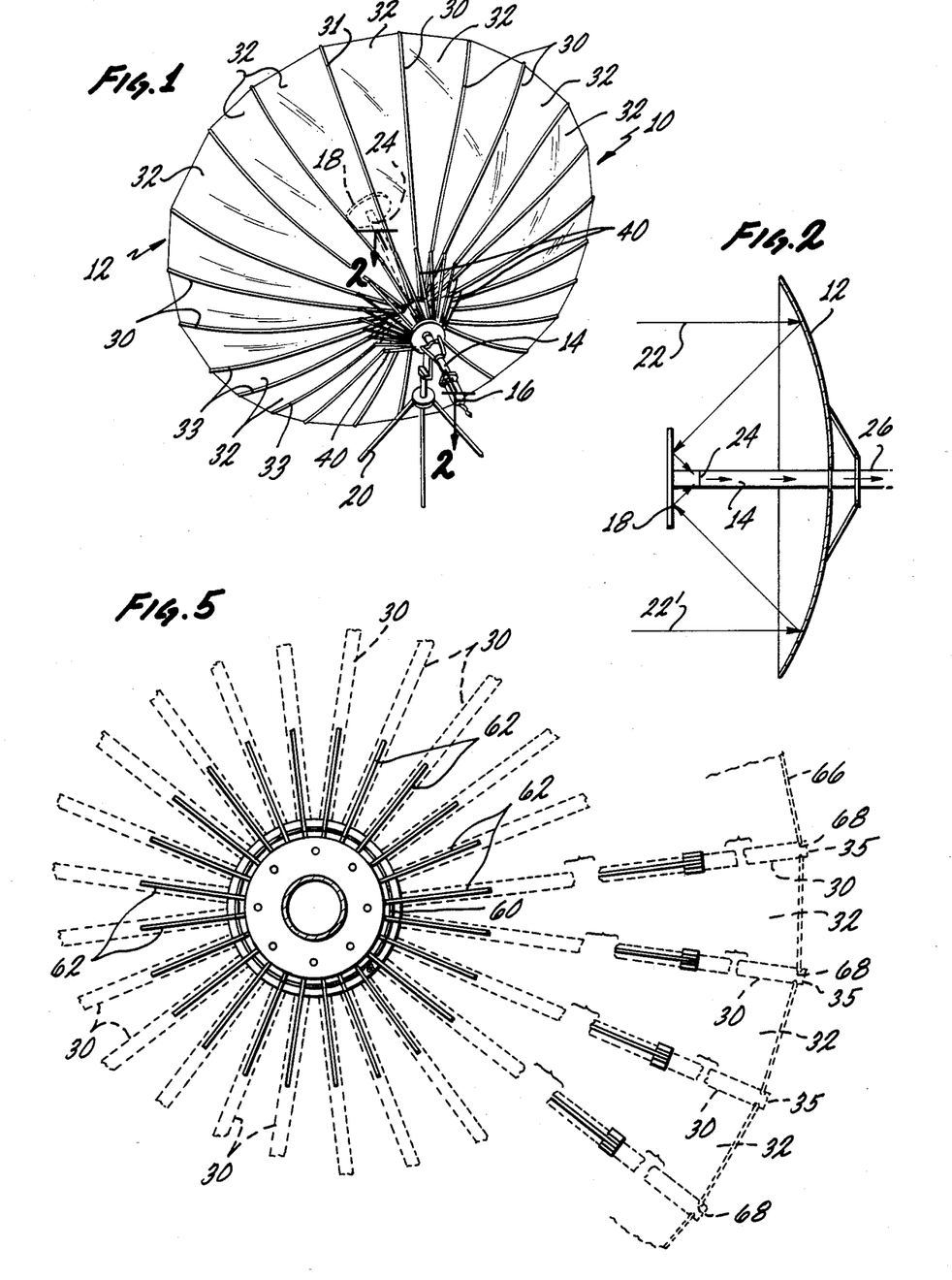
FIG. 1 is a rear perspective view of a portable parabolic dish antenna incorporating the folding reflector of this invention.
FIG. 2 is a schematic cross section showing the optics of the antenna of FIG. 1.
FIG. 5 is a cross section taken along line 3—3 of FIG. 3 showing the main reflector assembly in three radially broken apart sections, the innermost section showing the mounting of the radial spokes to the central hub, the intermediate section showing the connection of the pivot levers to the radial spokes, and the outermost section showing the perimeter cable threaded through the spoke tips.

Turning now to FIG. 1 of the drawings, a receiving antenna 10 comprises a main reflector 12 in the form of a parabolic dish supported on an axial metallic tube 14 which is both the main support for the various components of the antenna system as well as being a wave guide for transmission of electromagnetic waves from the focal point to a receiver amplifier 16 mounted to the rear end of the wave guide 14. A smaller secondary reflector 18 is shown as a dotted disc mounted to the front end of the wave guide 14 and supported entirely thereby. The entire antenna assembly is supported by a tripod 20 preferably attached only to the wave guide 14 at a point intermediate the main reflector 12 and the amplifier 16.

FIG. 2 shows the optics of the receiving antenna 10, where incident rays 22 and 22' are reflected by the parabolic reflector 12 towards the front of the axial wave guide 14 where the rays are again reflected by the secondary reflector 18 towards the open front end 24 of the wave guide 14. The electromagnetic wave is transmitted down the length of the wave guide 14 towards the rear end 26 of the wave guide.

The main reflector 12 of FIG. 1 is seen to consist of a plurality of evenly spaced radial spokes 30 mounted to the wave guide 14, and wedge shaped panels 32 of a pliable substantially inelastic reflecting material supported between each adjacent pair of radial spokes 30 to define a dished reflector 12 with a concave surface facing the forward end 24 of the wave guide 14. The reflecting surface is formed by attaching side-by-side trapezoidal panels 32, the long, divergent sides of which are cut along a curve calculated to yield a parabolic curve along the line of juncture 31 of adjacent panels 32.

The individual spokes are encased in tubular folds 33 extending radially on the rear surface of the reflector dish along each line of juncture 31.

The presently preferred spokes 30 are tapered normally straight resiliently flexible rods of circular cross section and hollow construction. In a preferred embodiment a parabolic reflector ten feet in diameter is constructed with hollow fiberglass rods five feet in length and having wall thickness of one sixteenth of an inch (1/16"), and tapering from a maximum internal diameter of one half of an inch (½") at the butt end to an internal diameter of five sixteenths of an inch (5/16") at the tip. With the specified spoke dimensions a focal length of approximately five feet can be obtained, yielding a 0.5 f/d ratio. This is a lower f/d ratio than has been possible until now in stressed reflector structures, and results in a lower antenna noise figure, as well as improved side lobe rejection. The optimal taper of the rods will vary with the desired diameter and f/d ratio of the finished dish reflector, i.e., the length and desired curvature of the spokes.

The tapering cross section creates a gradient in the stiffness of the rod along its length. By varying this gradient different curvatures may be obtained. One simple way of determining whether a given rod taper is suitable for use in a reflector of given f/d ratio is to load the rod to the same extent that it would be in the reflector, and cast a shadow of the stressed rod onto a surface on which has been drawn the desired curve.

A twelve-foot dish can be constructed with six-foot poles having the same rate of taper as the five-foot poles. The length of the poles is extended to terminate in an inside diameter of five thirty-seconds of an inch (5/32").

A spherical dish reflector can be obtained by making the spokes more flexible towards the tip end to get a greater curvature than would be necessary in a parabolic reflector. The pliable dish would also be made as a spherical segment.

Figures 3, 4:
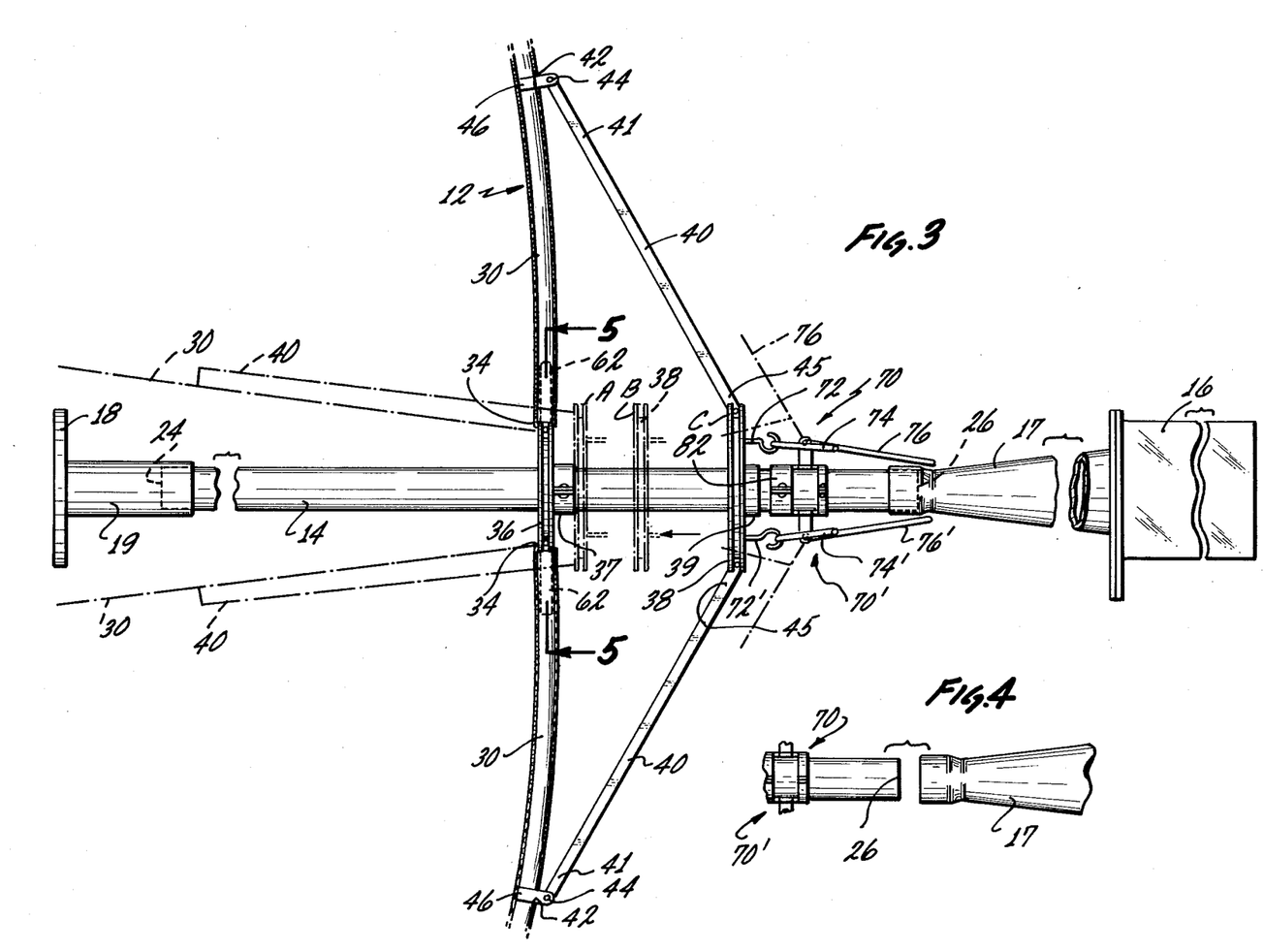
FIG. 3 is an axially broken cross section taken along line 2—2 of FIG. 1 showing the pivotal mounting of the main reflector spokes to the axial wave guide, the secondary reflector, and the amplifier housing mounted to the rear end of the wave guide.
FIG. 4 shows the detachable coupling of the amplifier transition to the rear end of the wave guide.

Turning now to FIG. 3, the wave guide 14 is seen to consist of a straight metallic tube having a front end 24 and a rear end 26 and open at both ends. The tube 14 is of a suitable metallic substance such as aluminum or a steel alloy having sufficient strength to provide adequate relatively rigid support for the main reflector 12, as well as the secondary reflector 18 and amplifier housing 16 mounted at the front and rear ends respectively. The internal diameter of the tube 14 is chosen such that it serves as a wave guide for electromagnetic radiation at a desired frequency band.

Figures 6, 8, 9:
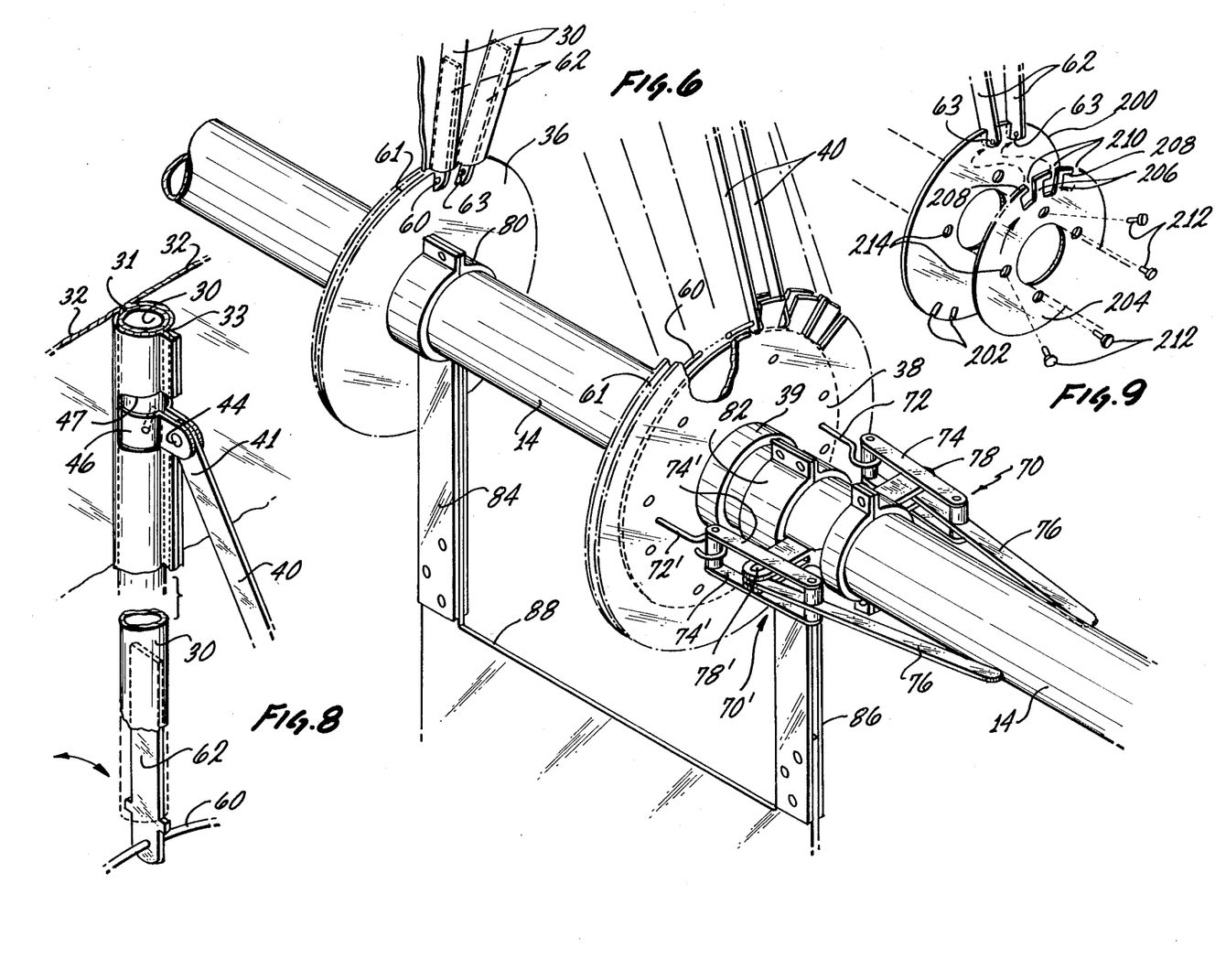
FIG. 6 is a partial perspective view of the pivotal mounting of the radial spokes and pivot levers to their respective hubs on the axial wave guide together with the pivot lever locking assembly.
FIG. 8 is a partial perspective view in two radially broken apart sections showing the preferred pivotal mounting of one spoke to the retaining ring of the stationary central hub, and the hinged connection of a pivot lever to an intermediate portion of the radial spoke.
FIG. 9 is an exploded perspective view of an alternate hub assembly for pivotal mounting of the spokes and levers of the folding reflector.

A pair of radially opposite spokes 30 are shown mounted at their radially inner butt ends 34 to a central hub structure 36. The hub 36 is in turn affixed to the wave guide 14 as by welding to a collar 37 or by any other suitable means. A second hub structure 38 of somewhat larger diameter is mounted for sliding movement along the wave guide 14 rearwardly of the first hub 36. Preferably, a short collar 39 is affixed to the hub 38 to keep it from wobbling. A pivot lever or linkage rod 40 connects the second hub 38 to an intermediate point 42 along each of the radial spokes 30. The levers 40 are connected for pivotal movement by pin 44 to a U-clip 46 secured at point 42 to the radial spokes 30. Each one of the radial spokes 30 and the levers 40 are mounted for pivotal movement at their radially inner ends to the respective central hubs, as illustrated in FIGS. 5 and 6. The sliding hub 38 is of enlarged diameter to thereby space the levers radially outwardly about the spokes in the folded position.

The presently preferred structure of the central hubs 36 and 38 is best understood in the exploded view of FIG. 7. A first disc 48 has evenly spaced radial slots 50 formed therein and is centrally perforated for receiving the axial tube 14. A second disc 52 is similarly centrally apertured and also includes radial slots 54 in register or alignment with the radial slots 50 of the first disc 48. A spacer disc 56 of reduced diameter is interposed between the first and second discs 48 and 52 respectively such that an annular space or groove 61 (best seen in FIG. 6) is defined between the discs 48 and 52 when they are brought into opposing abutting relationship with the spacer 56. An annular retaining wire or ring 60 shown in broken portions only in FIG. 7 loosely encircles the spacer 56 within the annular space between the first and second discs 48 and 52. A mounting member 62 of elongated planar configuration is provided for each radial spoke and has formed at one end a hole 63 through which passes the annular retaining ring 60, each mounting member 62 being retained by the ring 60 within one aligned pair of grooves 50, 54 of the spaced discs 48 and 52. The members 62 are thus free to pivot about the wire 60 in a plane perpendicular to the discs 48 and 52, while the members 62 are retained in fixed radially spaced relationship within the aligned grooves 50 and 54. The radially outer end 64 of each mounting member 62 is received within the hollow interior of one radial spoke 30 and secured therein. In this fashion the spokes 30 are mounted to the hub assembly for pivotal movement between a generally axial folded position and a generally radial or extended position. The discs 48 and 52 are affixed to the spacer 56 by suitable means such as riveting at holes 53. Preferably, each hub is provided with a short collar coaxial with the wave guide 14 for improved support.

In FIG. 6, the simultaneous pivotal movement of the radial spokes 30 is effected by means of levers or linkage rods 40 which are preferably straight elongated members formed of sheet metal such as aluminum or steel, and are hingedly attached at one end to the radial spokes and pivotally connected at the opposite or rear end to a hub 38 of construction similar to that of hub 36, as described above. Hub 38, however, is mounted to the axial support or wave guide 14 for sliding movement along the axial support rearwardly of the fixed spoke hub 36. The pivotal movement of the radial spokes 30 between the folded and the extended positions is thus effected by sliding movement of the sliding hub 38, the movement of the sliding hub 38 being transmitted to the pivoting spokes 30 by the levers 40.

The linkage rods or levers 40 are connected to the radial spokes 30 for pivotal movement as best shown in FIG. 8. The forward or radially outer end 41 of the lever 40 is hingedly attached at pivot pin 44 to a U-clip 46 secured to the radial spoke 30. The position of the U-clip will determine the amount of leverage obtained through the linkage rods 40. That is, the greater the radial displacement of the clip 46, the greater the leverage that will be obtained to deploy the reflector. For a reflector of ten to fifteen feet in diameter it has been found adequate to place the clips 46 within a range of ten to twenty inches from the butt end of the spoke 30, the preferred point being fourteen inches from the center for a spoke length of five feet. The clip 46 extends from the spoke 30 through an opening 47 formed in the fold of sheet material encasing the radial spoke 30.

In practice it may be found more convenient to fold the reflector assembly by applying manual force to the radial spokes directly rather than applying leverage through the linkage rods 40 and sliding hub 38. Deployment of the reflector, however, can be effected quite easily by pulling back on the sliding hub 38 and relying on the linkage rods 40 to pull back the radial spokes 30 to the radially extended position, as shown in the phantom line sequence A, B, C in FIG. 3.

Figures 12, 13:
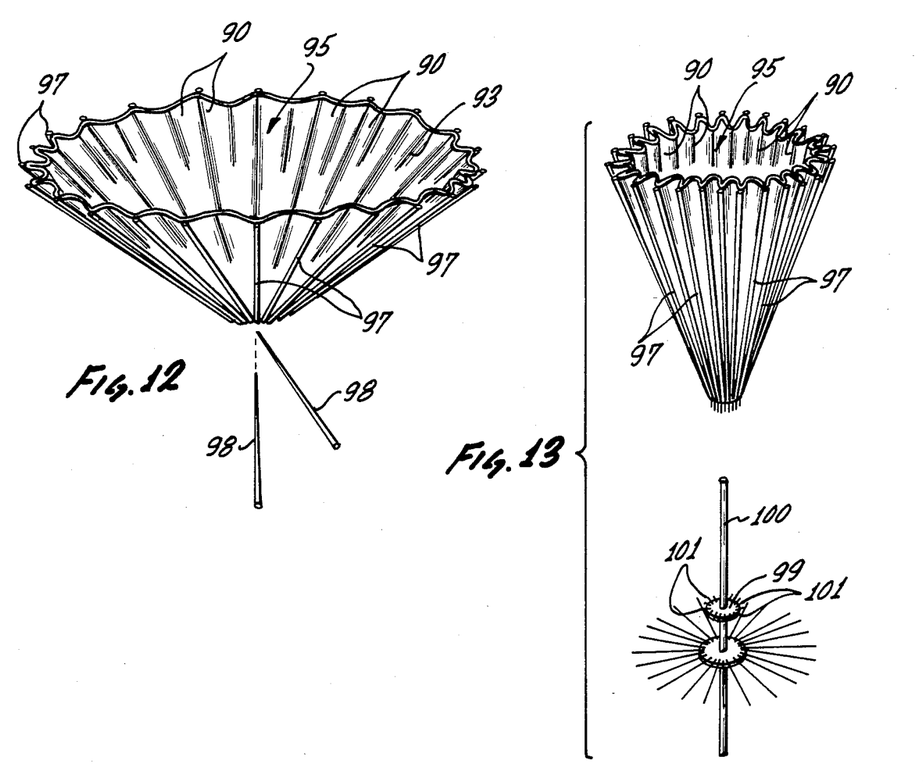
FIG. 12 shows the preferred manner of inserting individual radial spokes into the folds of the pliable reflecting dish.
FIG. 13 shows the manner of pivotally mounting the inserted spokes to the central hub.
Figures 14, 15:
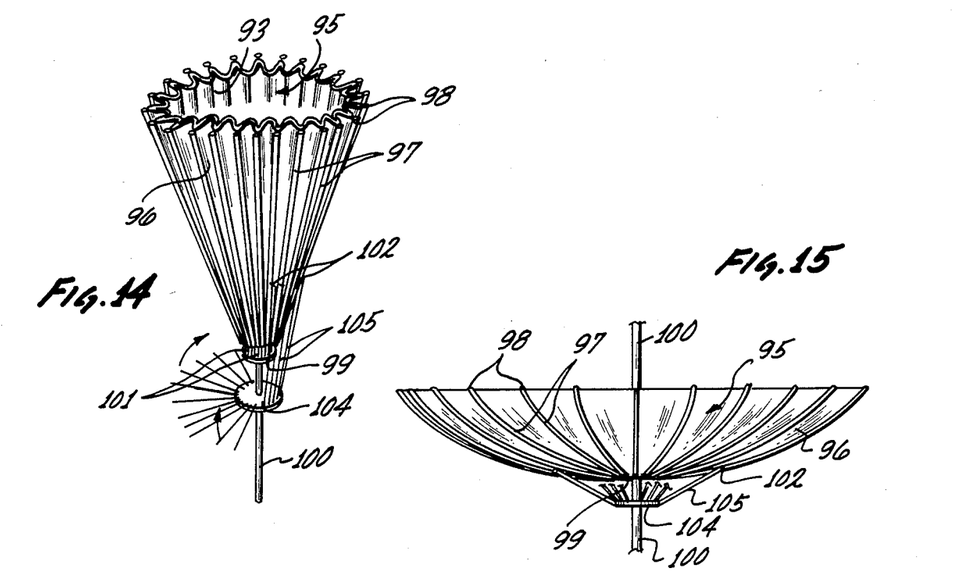
FIG. 14 shows the manner of attaching the pivot levers to the mounted radial spokes.
FIG. 15 shows the reflector dish in deployed radially extended position.

The radial spokes 30 are normally straight in the unstressed folded position as shown in phantom position A in FIG. 3 and also at FIGS. 12-14. As the tapered radial spokes 30 are pulled back and pivot to the radially extended position, the spokes 30 are stressed by the preformed dish of pliable reflecting material and are forced to conform to the predetermined curvature of this dish 12, since the dish is formed of substantially inelastic material in a manner that is described below in connection with the method of manufacture.

In a preferred embodiment the radial spokes are stressed to a desired curvature, independently from the dish curvature, by a cable 66 threaded through the tips of the spokes to form a perimeter of reduced diameter, that is, a diameter less than the unstressed diameter of the fully extended radial spokes 30. The spokes are curved to the desired shape by the cable and little, if any, reliance is placed on the shape of the dish to obtain a given spoke curvature. However, both the stressed spokes and the dish must be formed initially to closely similar curvatures in order to obtain the necessary co-operation between the two individually curved elements. Minor deviations in one element will tend to be corrected by the other element to thus retain a precise overall curvature in a folding reflector. The cable 66 shown in FIG. 5 may be made of steel and is threaded through openings or eyelets 68 formed in the tips 35 of the radial spokes 30. Thus, as the radial spokes 30 are pivoted to the radially extended position, increasing resistance against such deployment will be encountered due to the combined effect of the preformed reflector dish 12 and the restricted perimeter cable 66, both cooperating to stress the spokes to the desired curvature.

In a relatively large dish, for example, having a ten- to fifteen-foot diameter and using fiber glass radial spokes, it has been found that it is difficult to fully deploy the reflector through manual force alone against the aforedescribed stress forces. To aid in the quick and easy deployment of the dish reflector, a pair of over-the-center cam locks 70 and 70', best seen in FIG. 6, are affixed to the axial support or wave guide 14 rearwardly of the sliding hub 38. Hub 38 is provided with a pair of rearwardly extending hook members 72 and 72' which are preferably threaded into the hub 38, such that the hooks may be threaded into and out of the hub 38 to adjust the effective length of the hook members rearwardly of the hub 38. Each over-the-center cam lock 70, 70' has a retaining member 74 for engaging one of the hooks 72, 72', respectively, and a lever 76 which is pivotally mounted to the axial support or wave guide 14 at pivot point 78 for applying rearwardly directed force to the retaining member 74, thus pulling back the hub 38 through the hook members 72, 72'. The over-the-center cam lock pair thus serves the dual function of leveraging the manual force applied to the lever 76 to facilitate the full deployment of the dished reflector against resistance of the spokes, as well as serving to lock and retain the hub 38 at its rearmost position to thereby retain the reflector in stressed fully deployed position. The hub 38 is released for folding the reflector by pivoting the levers 76 to a forward position as shown in phantom line in FIG. 3, and then disengaging the hooks 72 from the retainers 74. Thus, the reflector can be partially deployed by manually unfolding the dish-spoke assembly as represented by movement of the sliding hub 38 in FIG. 3 from the phantom position A to the phantom position B. As increasing resistance is met, the over-the-center cams are engaged with the hooks 72, 72' for movement of the hub 38 to the solid-line position C, this rearmost position of the hub 38 corresponding to full deployment of the reflector dish.

It will be appreciated that the rearmost position of the sliding hub 38 is adjustable by means of the threaded hooks 72, 72', which position in turn determines the stress or rearward force applied to the spokes at points 42 by the levers 40. The curvature of the central portion of the dish 12 is thus adjustable by threading the two hooks 72, 72' into and out of the corresponding threaded bores in the sliding hub 38.

The periphery of the reflector dish can be adjusted for optimum curvature by appropriate adjustment of the cable perimeter 66, as has been explained.

The reflector of this invention is thus provided with means for independently adjusting the curvature of the peripheral, radially outer area of the reflector disc, and the central, radially inner area of the reflector. The curvature of the dish can be checked against a template and corrections made as necessary.

The secondary reflector 18 may be affixed to the front end 24 of the wave guide 14 by means of a sleeve 19 which fits at its rear end over the open front end 24 of the wave guide and is securely affixed to the center of the secondary reflector disc 18 at its opposite end. The cylinder 19 closes the front end of the wave guide against entry of foreign matter, debris and moisture, but is made of a material transparent to electromagnetic radiation, such as plastic or plexiglass. Thus, the radiation focused by the main reflector dish 12 is reflected without hindrance into the front end of the wave guide 14 by the secondary reflector 18. Alternatively, the cylinder may be replaced by a plug which fits at its rear end into the open end 24 of the wave guide.

The housing 16 for a low noise amplifier can be mounted to the rear end 26 of the wave guide 14 by means of a mating transition 17. The transition is detachable as shown in FIG. 4. In certain frequency ranges the wave guide tube 14 can be made of internal diameter sufficient to accommodate the electronic circuits of a low noise amplifier without need for a separate amplifier housing. This is specifically possible in the 3-4 gigahertz range, to further simplify the antenna structure.

An alternate center hub structure, both fixed and sliding, for the pivotal mounting of the radial spokes and the linkage rods, respectively, is shown in FIG. 9.

A first disc 200 defines a plurality of peripheral radial slots 202 and is centrally apertured for receiving the axial support tube or wave guide 14.

A second disc 204 is similarly centrally apertured and is provided with a number of radial fingers 206. Each radial finger is provided with a tangentially projecting pin 208 which extends in a clockwise direction into the space between adjacent radial fingers 206 but does not fully bridge this space, so as to form a gap 210 between the end of the pin and adjacent radial finger.

For assembly of the alternate hub the mounting members 62 are disposed radially in the slots 202, the second disc 204 is brought into adjacent relationship with the first disc 200 with each of the mounting members in register with a gap 210 of the second disc. The second disc 204 is then rotated clockwise with respect to the first disc 200 such that the pins 210 simultaneously engage the hole 63 formed in the radially inner end of each mounting member 62. The two discs are then secured to one another by means of one or more rivets 212 fitting into aligned holes 214.

The mounting members 62 are thus free to pivot about the pins 206 within the radial slots 202, and are held g in fixed radially spaced relationship with each other by the first disc 200.

A preferred material for the radial spokes is fiber glass, the rods being made by known processes such as by winding resin impregnated fiber glass cloth on a tapered core, the core being withdrawn after hardening of the resin. The invention is not restricted to hollow spokes, and other materials may be found equally suitable, such as carbon, graphite, metal and others. Fiber glass is preferred in that it is a low cost, readily available material of great resiliency, largely impervious to weather, and very durable.

The pliable reflecting material for the panels 32 may be metallized mylar which provides a pliable, nonelastic base and a thin film of metal as the necessary reflecting surface for reflecting electromagnetic radiation, and if finished to a high polish, is also suitable for reflecting solar radiation. For radio communication purposes, the reflecting material may be an open mesh, either a metallic mesh, or a mesh of synthetic material covered with a thin metallic film.

Method of Assembly

Figure 10:
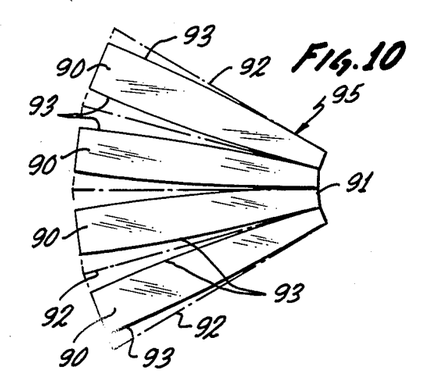
FIG. 10 shows a number of adjacent reflecting panels prior to attachment along the curved divergent sides for assembly into a complete, pliable reflecting dish.

The method of this invention is described with reference to FIGS. 10-17 of the drawings. FIG. 10 shows a plurality of trapezoidal panels 90, each having initially straight divergent sides 92 shown in dotted lines. The divergent sides of the trapezoidal panels are cut to a curve 93 calculated such that when adjacent panels 90 are joined along the curved edges 93 the resulting joint line will be a paraboloidal curve or an arc of a circle, depending on the desired curvature of the assembled reflector dish. A number of panels 90 are joined side by side in this manner to form a complete circle, to form a pliable dish structure approximating a paraboloid of revolution or a spherical segment. It is understood that at this point the dish is not in a stretched condition, rather it is a loosely folded structure of pliable sheet material or fabric. The dish 95 has no rigid support at this stage of assembly.

Figure 11:
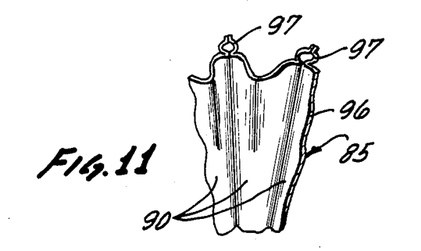
FIG. 11 is a fragmentary view of the assembled pliable reflecting dish with the spoke receiving tubular folds formed thereon.

A plurality of folds 97 which may be formed concurrently with the joining of the individual panels 90, are formed in the rear or convex surface 96 of the dish 95 as shown in FIGS. 11 and 12. The folds 97 are of tubular structure so as to snugly receive within each tubular fold one of the tapering radial spokes 98. The insertion of the spokes 98 is illustrated in FIG. 12 resulting in a loose, generally conical structure wherein the dish 95 is provided with radial support but the individual panels 90 supported between adjacent spoke pairs remain in a loosely folded condition.

After each of the tubular folds 97 has received a corresponding radial spoke 98, the resulting assembly is mounted as shown in FIG. 13 on an axial support 100 having affixed thereto a stationary hub 99. The hub 99 is provided with a plurality of radial pivoting mounting members 101, each mounting member being adapted to fit into the butt end of one spoke 98. The axial support 100 is inserted through the central aperture 91 of the dish 95, the central aperture being defined by the truncated radially inner ends of the panels 90. Each of the mounting members 101 is pivoted upwardly from the position shown in FIG. 13 into alignment with a corresponding one of the radial spokes 98 and inserted into a receiving cavity formed in the butt end of the spoke 98, and secured therein by any convenient means such as gluing and/or clamping.

After the radial spokes 98 have been secured in this manner to the fixed hub 99, each of the radial spokes is connected at an intermediate point 102 to a slidable hub assembly 104 by means of a lever or linkage rod 105 as in FIG. 14. Each of the linkage rods 105 is also pivotally mounted to the hub 104 and is further pivotally mounted at point 102.

The reflector is deployed as in FIG. 14 by sliding rearwardly the hub 104 while the hub 99 remains affixed to the axial support 100. The levers 105 operate to exert a pulling force on the radial spokes 98 at points 102 thereof urging the spokes to a fully extended radial position.

The individual panels 90 are sewn together with strong nylon thread and the perimeter of the dish may be finished and reinforced by a tape or other binding in the manner of a hem made of an adequate material, perforated to receive and secure the tips 112 of the radial spokes 98.

Figures 16, 17:
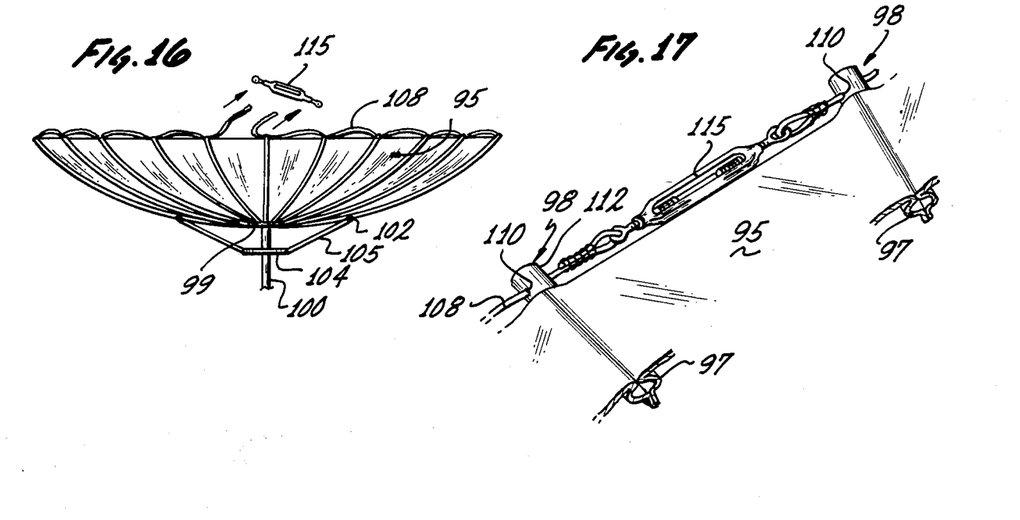
FIG. 16 illustrates the threading of a cable through the spoke tips to define a perimeter.
FIG. 17 is an enlarged view of a turnbuckle used to adjust the cable perimeter of the folding reflector dish.

In a preferred embodiment this perimeter binding includes a cable such as a steel cable 108 in FIGS. 16 and 17, which is passed through openings or eyelets 110 formed in the tips 112 of the radial spokes 98. The pliable dish 95, in cooperation with the perimeter cable 108, operates to restrain the spokes 98 against such complete radial deployment, thereby stressing the radial spokes 98 to a curvature in compliance with the curvature of the pre-formed dish 95 since the spokes 98 are attached along their full length to the rear convex surface 96 of the dish 95. For this purpose the dish 95 is made of a substantially inelastic material such as mylar or an aluminized polyester cloth on the concave or interior side 93 of the dish. The rear convex side 96 of the dish may be a backing of polyester, dacron or nylon cloth. The fabric may be reinforced against stretching by stitching a square pattern of nylon threads placed ¼ of an inch apart and laminating the nylon threads by compression onto the reflector fabric. Other means of reinforcing the fabric may be resorted to.

A turnbuckle 115 completes the cable perimeter by joining the ends of the cable 108 such that the length of the cable perimeter may be adjusted for fine adjustment of the curvature of the reflector surface. Thus, by constricting the perimeter cable 108, the curvature of the spokes 98 may be increased beyond the curvature imposed by the fabric of the dish 95. While the metallized fabric of the dish 95 is substantially inelastic in order to retain the dished form, it is preferably chosen to have a small amount of elasticity sufficient to resiliently respond to small changes in the geometry of the spokes 98 as a consequence of adjustment of the perimeter cable 108. Such a small degree of elasticity is inherent in many woven fabrics and synthetic sheet materials. The cable 108 also serves to prevent eventual stretching of the dish fabric and deterioration of the dish curvature.

Alternate Method of Making a Dish Reflector

FIGS. 18-20 illustrate an alternate method of achieving a paraboloid or spherical reflector. In this method, normally straight resiliently tapered radial spokes 120 of tapered cross section are mounted to a fixed hub 122. A plurality of trapezoidal panels 124 is attached between adjacent spoke pairs to form a planar disc 125. The panels 124 are of an elastic material in contrast to the previously described method which utilizes substantially inelastic reflecting fabric. The elastic panels 124 are mounted in an initially stretched condition between the adjacent spokes 120. A perimeter cable 126 is threaded through openings or eyelets 130 provided in the tips 128 of the spokes 120. The perimeter cable is then constricted to a reduced diameter which is less than the diameter of the unstressed radially deployed spokes of FIG. 18. This constricted perimeter cable 126 stresses the spokes 120 to a curvature which is determined by the diameter of the constricted cable perimeter 126. The panels 124 resiliently absorb the resulting slack due to their initially stretch condition. The result is a dished structure as shown in FIG. 20. The cable 126 is threaded through the eyelets or openings 130 in the tips 128 for sliding movement therethrough. In this manner, as the perimeter cable 126 is constricted to a reduced diameter, the spacing of the spokes 128 is evenly maintained since the cable simply slides through the eyelets 130.

A turnbuckle may be used to connect the two ends 132 and 134 in FIG. 19, the turnbuckle providing a means for fine adjustment of the cable perimeter length, which in turn serves to adjust the curvature of the dish reflector 140. It is understood that the reflector dish structures produced by either the preferred or alternate methods can be of the folding type if the spokes are mounted for pivotal movement and a sliding hub and linkage rods are provided.

While the foregoing description of the invention was made with reference to a parabolic receiving antenna, it will be understood that the same principles can be extended to transmitting antennas as well as reflectors for collecting and concentrating solar or acoustic energy, and the scope of the invention is defined only by the claims which follow.

What is claimed is:

1. A reflector antenna comprising:
   a wave guide having a front end and a rear end and being open at both ends to electromagnetic radiation;
   a primary reflector at least partly supported by said wave guide for reflecting electromagnetic radiation towards said front end of said wave guide, said primary reflector including;
   a pliable dish of substantially inelastic reflecting sheet material having a concave front surface and a convex rear surface;
   a plurality of resiliently flexible normally straight spokes of tapering cross section mounted at their thicker ends to a central hub for pivotal movement between a folded axial position and a deployed radial position relative to said central hub, the cross-sectional taper of each spoke being such that the spoke is stressable to a particular curvature conforming to the curvature of said pliable dish;
   means for attaching said plurality of radial spokes to said pliable dish such that said dish complies with the curvature of said spokes;

first means for simultaneously urging each of said radial spokes to aradially deployed postion; second means cooperating with said first means for stressing said spokes in said deployed position to said curvature thereby to conform with the curvature of said pliable dish, said stressed spikes thus deploying said dish to present a substantially smooth, concave front reflecting surface, said spokes being relieved of said stress in said folded position to thereby return to said normally straight condition; lock means for releasably retaining said spokes in said stressed deployed position; and a secondary reflector mounted to said front end of said wave guide for reflecting said radiation into said wave guide.

2. The reflector assembly of claim 1 wherein said means for urging comprise
a movable member slidable along said wave guide rearwardly of said spokes;
lever means operatively connected between said spokes and said movable member for effecting simultaneous pivotal movement of said spokes by sliding movement of said movable member; and,
said means for retaining comprise lock means engageable with said movable member for retaining said movable member in a selected position along said wave guide, said selected position being adjustable for adjusting the curvature of said spokes in said stressed extended position.

3. The reflector assembly of claim 1 wherein said sheet means comprises a plurality of trapezoidal panels cut so as to assume a dished shape when said panels are attached side by side in a complete circle, each panel being supported between a pair of said spokes and operating to stress said tapered spokes in said extended position to a curvature conforming to said dished shape.

4. The reflector assembly of claim 1 further comprising means connecting the radially outer ends of said spokes for stressing said spokes to a predetermined curvature in said radially extended position.

5. The reflector assembly of claim 1 wherein said means for urging comprises:
lever means disposed rearwardly of said sheet means and connected to each of said spokes for effecting simultaneous pivotal movement of said spokes between said stressed extended position and said folded position.

6. The reflector assembly of claim 5 wherein said radial spokes are pivotally mounted to a fixed hub assembly, said hub assembly comprising:
a first disc having a front side and a rear side and having a plurality of radial slots formed therein;
a second disc member secured adjacent to said rear side having a plurality of radial fingers, each finger being provided with a tangentially projecting pin, each said pin extending through a hole formed in the butt end of one of said radial spokes,
whereby said spokes are free to pivot about said pins within said radial slots.

7. The reflector assembly of claim 6 wherein said lever means are mounted at one end thereof to an axially slidable hub assembly of enlarged diameter with respect to said fixed hub.

8. The reflector assembly of claim 5 wherein said lever means comprise a plurality of radial linkage rods, each rod being hingedly connected at its radially outer end to one of said spokes and being pivotally connected at its radially inner end to a hub assembly slidable along said wave guide rearwardly of said spokes.

9. The reflector assembly of claim 8 wherein said hub assembly comprises:
a front disc having a front side and a rear side and having a plurality of radial slots formed therein;
the radially inner end of said linkage rods being received by one of said radial slots and extending rearwardly thereof whereby said rods are in fixed spaced relationship about said first disc;
a second disc member secured adjacent to said rear side and having a plurality of radial fingers, each finger being provided with a tangentially projecting pin, each said pin extending through a hole formed in the radially inner end of said linkage rods;
said first and second discs being centrally apertured for receiving said wave guide whereby said linkage rods are free to pivot within said slots about said pins and are retained on said pins by the disc portions defining said slots.

10. The reflector assembly of claim 5 or claim 6 wherein each of said levers is connected to one of said spokes at a point located within the radially inner half of the spoke.

11. The reflector assembly of claim 5 further comprising:
a movable member slidable along said wave guide rearwardly of said spokes;
said lever means being operatively connected between said spokes and said movable member for effecting simultaneous pivotal movement of said spokes by sliding movement of said movable member;
said movable member being engagable by said lock means for retaining said movable member to a selected position along said wave guide, said selected position being adjustable for adjusting the curvature of said spokes in said stressed extended position.

12. The reflector assembly of claim 5 wherein said sheet means comprises a plurality of trapezoidal panels cut so as to assume a dished shape when said panels are attached side by side in a complete circle, each panel being supported between a pair of spokes and operating to stress said tapered spokes in said extended position to a curvature conforming to said dished shape.

13. The reflector assembly of claim 5 or claim 12 wherein said means for stressing comprise cable means connecting the radially outer tips of said spokes for stressing said spokes to a predetermined curvature towards said front end in said radially extended position.

14. The reflector assembly of claim 13 further comprising means for adjusting said cable means to thereby adjust the curvature of the radially outer portion of said reflecting surface.

15. The reflector assembly of claim 5 or claim 13 wherein said lock means are engageable for retaining said lever means in a rearmost position corresponding to said stressed fully deployed position of said spokes;
and further comprising means cooperative with said lock means for adjusting the retained position of said lever means to thereby adjust the curvature of the central portion said reflecting surface.

16. The reflector assembly of claim 1 or claim 5 further comprising means for adjusting the curvature of said spokes in said stressed radially extended position.

17. The reflector assembly of claim 1 or claim 5 wherein said spokes are tapered fiberglass rods.

18. The reflector assembly of claim 1 or claim 5 or claim 17 wherein said tapered spokes are hollow tapered rods.

19. The reflector assembly of claim 1 or claim 5 or claim 17 wherein said tapered spokes are of cylindrical cross section.

20. The reflector assembly of claim 1 further comprising means cooperative with said lock means for adjusting the curvature of the central portion of said reflecting surface.

21. The reflector assembly of claim 1 further comprising means for adjusting said cable means to thereby adjust the curvature of the radially outer portion of said reflecting surface.

22. A reflector anntenna comprising:

an axial metallic tube having an open front end and an open rear end and having an internal diameter dimensioned for use as a wave guide for electromagnetic waves in a given frequency range;

a plurality of normally straight resiliently flexible radial spokes of tapered cross section, each having a butt end and a tip, mounted at their thicker radially inner butt ends to said wave guide for pivotal movement between an extended generally radial position and a folded generally axial position;

metallized pliable sheet means of pre-formed dished shape supported between said spokes and deployable by said spokes in said extended position to form a dished reflector for focusing electromagnetic radiation towards said front end;

means of material transparent to said electromagnetic waves closing said open front end;

a sub-reflector affixed to said transparent means for reflecting said focused radiation into said front end of said metallic tube;

a hub slidable along said tube rearwardly of said spokes;

a plurality of levers each pivotally attached at one end thereof to one of said tapered spokes at a point along the radially inner half of said spoke, the opposite end of each said lever being pivotally attached to said slidable hub, whereby said spokes may be simultaneously moved from said folded to said extended position by rearward sliding axial movement of said hub; and, cable means connecting said spokes at their tips to form a perimeter of reduced diameter so as to stress said tapered spokes to a predetermined curvature closely corresponding to the curvature of said preformed dished reflector as said spokes are moved to said extended position; and, means for releasably retaining said slidable hub in said rearward position against said resilience of said stressed spokes;

said resilient spokes being relieved of said stress in said folded position to thereby resume said normally straight attitude;

said cable means, said sheet means, said resilient tapered spokes, and said lever means cooperating to define a substantially smooth, dished reflecting surface in said extended, deployed position, and wherein the curvature of said dished reflector and the curvature of said stressed spokes cooperate to retain a desired reflector curvature.

* * * * *